Figure 1:
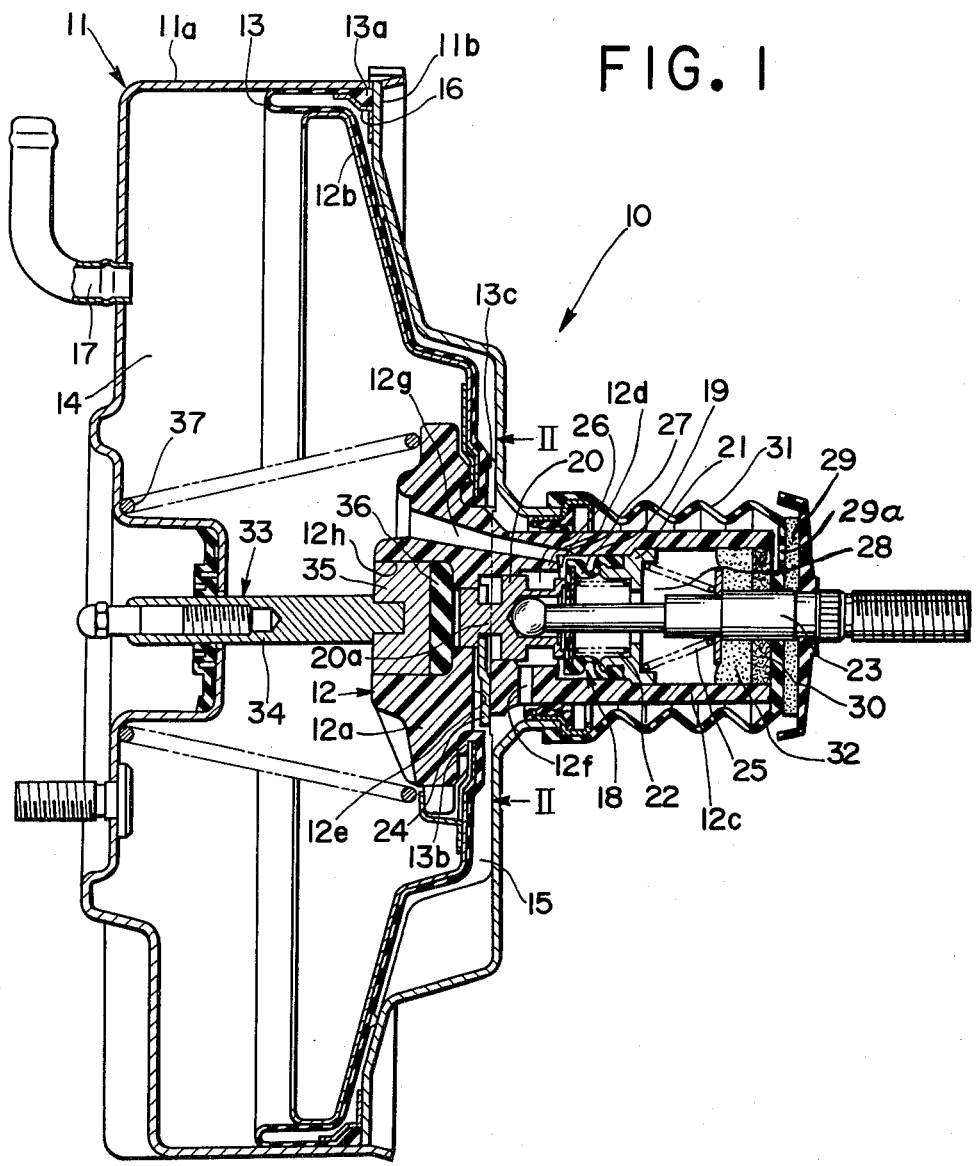

United States Patent [19]

Ohmi

[11] 4,363,259
[45] Dec. 14, 1982

[54] BRAKE BOOSTER
[75] Inventor: Atsushi Ohmi, Anjo, Japan
[73] Assignee: Aisin Seiki Kabushiki Kaisha, Japan
[21] Appl. No.: 137,815
[22] Filed: Apr. 4, 1980
[30] Foreign Application Priority Data
  May 15, 1979 [JP] Japan .................................. 54-59251
[51] Int. Cl.³ .............................................. F15B 9/08
[52] U.S. Cl. .................................... 91/422; 91/369 A; 92/99
[58] Field of Search ................. 92/98 D, 99, 166, 168; 91/6, 31, 369 A, 422, 222; 403/155, 319, 324
[56] References Cited
U.S. PATENT DOCUMENTS 3,452,646 12/1966 Abbott et al. ...................... 91/369 A
3,688,647 9/1972 Kytta ................................. 91/369 A
3,724,211 4/1973 Julow ................................. 92/168 X
3,937,021 2/1976 Sisco et al. ........................ 91/369 A
4,257,312 3/1981 Ohmi et al. ............................. 92/99

Primary Examiner—Abraham Hershkovitz
Attorney, Agent, or Firm—Finnegan, Henderson, Farabow, Garrett & Dunner

[57] ABSTRACT

A pneumatically operated brake booster in association with the hydraulic master brake cylinder of motor vehicles comprises a housing, an annular diaphragm having its outer periphery sealingly attached to the housing and its inner periphery sealingly attached to an axially movable power piston, a valve mechanism mounted in the power piston and operated by a manually operable push rod, which includes an air valve, and a key inserted into a radial slot of the power piston to thereby engage the air valve. The diaphragm is provided at the rear wall surface thereof adjacent to the housing with a plurality of radial projections abutting the housing. The circumferential space between neighboring radial projections is made smaller than the width of the key thereby holding the key in position and preventing the radial withdrawl thereof from the power piston.

1 Claim, 2 Drawing Figures

BRAKE BOOSTER

This invention relates to a brake booster and more particularly to improvements in a pneumatic brake booster used to operate hydraulic brake systems of motor vehicles.

Such a brake booster may be placed in an engine room of motor vehicles in which other various devices are also accommodated. Each of these devices is required to be of small size so as to avoid interference with other devices within the limited space of the engine room. When the brake booster is to be small in size, the decrease in the axial length thereof rather than in the radial direction is generally effective since the brake booster is connected in tandem to a master brake cylinder to actuate same.

The principal construction of the brake booster comprises a body housing, an annular diaphragm having its outer periphery sealingly attached to the housing, a power piston axially movable within the housing and dividing the interior of the housing into two pneumatic chambers, and a valve mechanism mounted in the power piston to be operated by a manually movable push rod thereby controlling the pneumatic pressure difference between the two chambers. The valve mechanism includes an air valve carried by the front end of the push rod, the retracted position of the air valve with respect to the power piston being limited by a key which is inserted into a radial slot of the power piston so as to engage the air valve.

Accordingly, it is necessary to employ means for holding the key in position without same being withdrawn from the radial slot, which holding means results in the reduction of the axial length of the brake booster.

It is therefore an object of the present invention to provide a brake booster in which an air valve is located at the relatively rearward position to thereby reduce the whole axial length of the brake booster.

It is another object of the invetion to provide a brake booster which includes means for holding a key in position to prevent withdrawal of the key member.

It is a further object of the invention to provide a brake booster that is economically manufactured while ensuring proper location of the key member.

Additional objects and advantages of the invention will be set forth in the following description with reference to the drawings.

Figure 2:
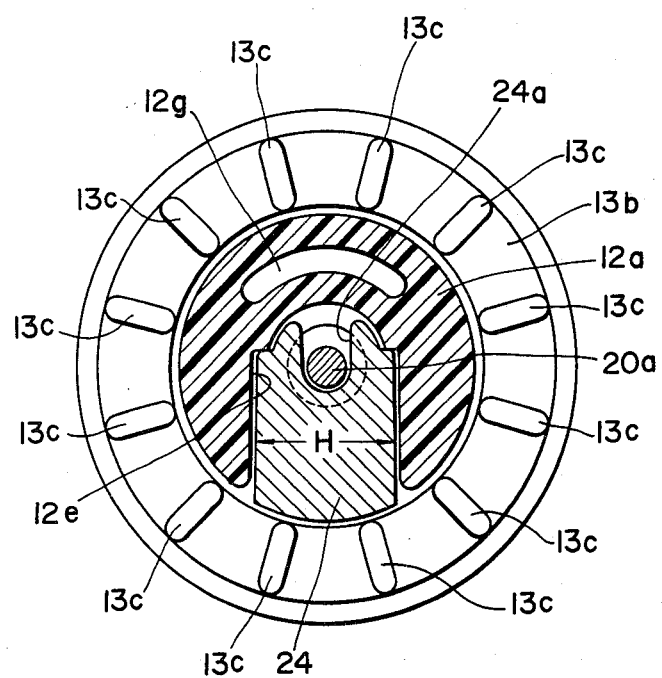

FIG. 1 is a cross-sectional view of a brake booster in accordance with the present invention; and FIG. 2 is an enlarged fragmentary cross-sectional view taken along line II—II of FIG. 1.

Referring now to the drawings, especially FIG. 1 thereof in which a pneumatic booster according to the invention is indicated by the reference numeral 10. Body housing 11 of the booster 10 is mounted on the vehicle body (not shown) and comprises a front shell 11a and a rear shell 11b securely connected to each other. The interior space of housing 10 is divided into a front pneumatic chamber 14 and a rear pneumatic chamber 15 by means of a power piston 12 and an annular diaphragm 13 made of rubber. The power piston 12 includes a center member 12a made of synthetic resin and a plate-like peripheral member 12b made of metal and fixed to the center member 12a. An outer periphery 13a of the diaphragm 13 is air-tightly or sealingly secured to the housing 11 by a suitable holding member 16 while an inner periphery 13b thereof is air-tightly or sealingly secured to the center member 12a and the plate-like peripheral member 12b of the power piston 12.

The front pneumatic chamber 14 is in normal communication with the negative or suction pressure source such as engine intake manifold (not shown) through a port 17 carried by the front shell 11a of the housing 11.

The center member 12a of the power piston 12 is integrally provided with a cylindrical hollow shaft 12c air-tightly and slidably extending out of the rear shell 11b in coaxial relationship therewith. In the cylindrical hollow shaft 12c is mounted a valve mechanism 18 which comprises a first valve member 19 and a second or air valve member 20. The first valve member 19 is provided with its rear end air-tightly secured to the inner wall of the axial hollow shaft 12c by a retainer 21 and with its front end urged to seat on an inward projection 12d of the cylindrical hollow shaft 12c by a spring 22. The second valve member 20 is carried by the forward end of a push rod 23 movably associated with the foot brake pedal (not shown) to be moved in the axial direction in unison with the push rod 23. The second valve member 20 is normally seated on the front end of the first valve member 19 as long as no force is applied to the push rod 23. In addition, the second valve member 20 is formed with a reduced diameter portion 20a which engages a key 24 inserted into a radial slot 12e of the center member 12a so as to limit the rearward movement of the second valve member 20 with respect to the power piston 12 beyond a predetermined extent, as will be hereinafter explained in more detail.

The push rod 23 is axially aligned to the second valve member 20 and coaxially mounted in the cylindrical hollow shaft 12c which is in turn coaxially mounted in a corrugated rubber boot 31. The boot 31 is suitably affixed between the outer end of the shaft 12c and the outer end of the rear shell 11b of the housing 11 to provide a suitable seal for the sliding sealing outer surfaces of the cylindrical hollow shaft 12c.

The push rod 23 is normally urged to move in the rearward direction by a helical spring 25 interposed between the retainer 21 and the push rod 23 so that the second valve 20 is brought, at the front inner end thereof, into abutment with the key 24 as is shown in FIG. 1 insofar as the foot brake pedal is released. Therefore, the rear pneumatic chamber 15 is in communication with the front pneumatic chamber 14 through a radial groove or passage 12f provided on the center member 12a, an annular passage 26 provided around the second valve member 20, a gap 27 between the first valve member 19 and the projection 12d, and a passage 12g formed in the center member 12a, thereby being admitted with negative pressure as in the front pneumatic chamber 14. The power piston 12 is thus maintained in the retracted position as illustrated by means of a return spring 37 interposed between the front shell 11a and the center member 12a of the power piston 12.

When the brake pedal is depressed to advance the push rod 23, the first valve member 19 and the second valve member 20 with respect to the power piston 12, the first valve member 19 is at first brought into engagement with the projection 12d to isolate the rear pneumatic chamber 15 from the front pneumatic chamber 14. The second valve member 20 is then released from the first valve member 19 with the results that the rear pneumatic chamber 15 is admitted with atmospheric air through air filter 29, port 29a, air filters 30 and 32, a passage 28, the clearance between the first and second valve members 19 and 20, the annular passage 26 and the radial groove 12f. Thus, the power piston 12 is moved in the forward direction due to the pressure differential between the two chambers 14 and 15.

An output member 33 for transmitting the force on the power piston 12 to the hydraulic master brake cylinder (not shown) includes an axial rod 34 which sealingly and slidably passes through the front shell 11a and a headed end 35 securely fitted thereto and slidably mounted in a bore 12h of the center member 12a. Within the bore 12h is carried a deformable reaction disc 36 interposed between the headed end 35 and the second valve member 20 for the purpose of resiliently transmitting force from the power piston 12 to the axial rod 34, whereupon the disc 36 is compressed and deformed to contact against the front face of the second valve member 20 thereby imparting the reaction force onto the brake pedal in proportion to the advancement of the power piston 12.

The retracted position of the power piston 12 is retained due to abutment of a plurality of radial projections 13c against the rear shell 11b of the housing 11. FIG. 2 will be explained in more detail. The key 24 is formed with a recess 24a through which the reduced diameter portion 20a of the second valve member 20 passes. The inner peripheral wall of the diaphragm 13 is provided, at the rear surface adjacent to the rear shell 11b of the housing 11, with a plurality of radial projections 13c arranged in the circumferential direction. The circumferential space between neighboring projections 13c is made smaller than a width H of the key 24 so that at least two of the radial projections 13c may receive, at inner peripheral ends thereof, the key 24 thereby holding the key 24 in position and preventing the withdrawal thereof from the power piston 12 through the radial slot 12e.

As apparent from the afore-mentioned embodiment, it is unnecessary to provide additional means for holding the key in position. In addition, an air valve of a valve mechanism mounted in the power piston can be located at the most rearward position within the range of the axial thickness of the radial projections to thereby decrease the whole axial length of the brake booster.

It will be apparent to those skilled in the art that various modifications and variations could be made in the brake booster of the invention without departing from the scope or spirit of the invention.

What is claimed is:

1. A brake booster comprising:
   a housing,
   an annular diaphragm having its outer periphery sealingly attached to said housing,
   power piston means axially movable within said housing and including a cylindrical hollow shaft, said annular diaphragm having its inner periphery sealingly attached to said power piston,
   a valve mechanism mounted in said cylindrical hollow shaft and including valve means located in axial alignment with a manually operable push rod,
   a key inserted in a slot of said power piston means to engage said valve means, and
   a plurality of radially directed, elongated projections circumferentially spaced about and proximate to the inner periphery of said diaphragm, said projections being integrally formed on the surface of said diaphragm adjacent said housing and disposed to contact said housing to limit axial movement of said diaphragm in one direction, the distance between the adjacent projections being less than the width of said key such that the inner peripheral ends of at least two of said projections hold said key in position.

* * * * *